(12) United States Patent
Lee et al.

(10) Patent No.: US 12,085,636 B2
(45) Date of Patent: Sep. 10, 2024

(54) SYSTEMS AND METHODS FOR DETECTION AND TRACKING OF UNMANNED AERIAL SYSTEMS

(71) Applicant: Raytheon Company, Waltham, MA (US)

(72) Inventors: Eugene Lee, Andover, MA (US); Steven G. Labitt, Newburyport, MA (US); Charles L. Holland, Bow, NH (US); Colin S. Whelan, Andover, MA (US); Benjamin L. Caplan, Reading, MA (US)

(73) Assignee: Raytheon Company, Tewksbury, MA (US)

( * ) Notice: Subject to any disclaimer, the term of this patent is extended or adjusted under 35 U.S.C. 154(b) by 362 days.

(21) Appl. No.: 17/071,700

(22) Filed: Oct. 15, 2020

(65) Prior Publication Data
US 2022/0120888 A1    Apr. 21, 2022

(51) Int. Cl.
*G01S 13/72*    (2006.01)
*G01S 7/41*    (2006.01)

(52) U.S. Cl.
CPC ............ *G01S 13/723* (2013.01); *G01S 7/412* (2013.01)

(58) Field of Classification Search
CPC ............ B64C 39/024; B64C 2201/146; B64C 2201/027; B64C 2201/00; B64C 2201/121; G08G 5/0069; G08G 5/0082; G01S 13/933; G01S 13/66; G01S 13/88; G01S 7/411; G01S 5/04; G01S 5/02; G01S 11/02; G01S 3/04; G01S 13/723; G01S 7/415; G01S 13/04; G01S 13/91; G01S 7/412; G01S 7/021; G01S 11/06; G01S 13/86; G01S 7/414; G01S 13/78; F41H 11/02; G06T 2207/30232; G06T 2207/10044; G06V 20/52; G06V 2201/07
See application file for complete search history.

(56) References Cited

U.S. PATENT DOCUMENTS

| 9,085,362 | B1 | 7/2015 | Kilian et al. |
| 9,896,221 | B1 | 2/2018 | Kilian et al. |
| 2010/0085236 | A1 | 4/2010 | Franceschini et al. |
| 2017/0039860 | A1 | 2/2017 | Just |

(Continued)

FOREIGN PATENT DOCUMENTS

| CN | 107678023 A | 2/2018 |
| CN | 110806575 A | 2/2020 |

(Continued)

OTHER PUBLICATIONS

PCT International Search Report and Written Opinion for Appl. No. PCT/US21/40819 dated Oct. 6, 2021.

(Continued)

*Primary Examiner* — Olumide Ajibade Akonai (57) ABSTRACT

Radar systems and methods detecting and tracking an unmanned aerial system (UAS) are provided. The radar system and methods can include determining whether or not a UAS is included in the plurality of electromagnetic signals received by the radar system based on one or more expected frequencies that one or more UAS devices use to transmit signals to remote controls. The radar systems and method can also involve switching the radar system into a track mode upon detecting a UAS.

20 Claims, 5 Drawing Sheets

(56) References Cited

U.S. PATENT DOCUMENTS

| | | | |
|---|---|---|---|
| 2017/0285142 A1 | 10/2017 | Parker et al. | |
| 2018/0081355 A1* | 3/2018 | Magy | H04K 3/65 |
| 2018/0129881 A1 | 5/2018 | Seeber et al. | |
| 2019/0349739 A1 | 11/2019 | Graham et al. | |
| 2019/0375503 A1* | 12/2019 | Maxwell | G07B 15/00 |
| 2020/0011966 A1* | 1/2020 | Vermersch | G01S 13/931 |
| 2020/0045416 A1* | 2/2020 | Kamio | G01H 3/125 |
| 2020/0272827 A1* | 8/2020 | Morrow | H04K 3/65 |
| 2022/0189326 A1* | 6/2022 | Hamminga | G01S 7/415 |
| 2023/0131377 A1* | 4/2023 | Burnell | G01S 5/0249 |
| | | | 342/451 |

FOREIGN PATENT DOCUMENTS

| | | |
|---|---|---|
| JP | H06-242235 A | 9/1994 |
| JP | 2001-051051 A | 2/2001 |
| JP | 2020-016639 A | 1/2020 |
| WO | WO 2019/136463 | 7/2019 |
| WO | WO2019151950 | 8/2019 |
| WO | 2020084322 A1 | 4/2020 |

OTHER PUBLICATIONS

Supplementary European Search Report dated Mar. 11, 2024 in connection with European Patent Application No. 21880721.2, 10 pages.

Notice of Reasons for Refusal dated Nov. 14, 2023 in connection with Japanese Patent Application No. 2023-522456, 9 pages.

Written Opinion dated Feb. 13, 2024 in connection with Japanese Patent Application No. 2023-522456, 4 pages.

Decision to Grant a Patent dated Mar. 5, 2024 in connection with Japanese Patent Application No. 2023-522456, 5 pages.

First Substantive Examination Report dated May 30, 2024 in connection with Saudi Arabian Patent Application No. 52344500, 14 pages.

* cited by examiner

SYSTEMS AND METHODS FOR DETECTION AND TRACKING OF UNMANNED AERIAL SYSTEMS

FIELD OF THE INVENTION

The invention relates generally to radar systems. In particular, the invention relates to detection and tracking of unmanned aerial systems (UAS).

BACKGROUND

Radar systems (e.g., radars) can be used to detect and/or track objects. For example, radar systems can be used on airplanes, ships, and/or ground vehicles to detect and/or track objects and determine whether they are friend or foe. Typically, in order for a radar system to detect an object, the radar system transmits electromagnetic energy for a predetermined duration and receives (e.g., listens) for a predetermined duration.

During receive, the radar system can receive reflections of the transmitted electromagnetic energy off of an object that is within a field of view of the radar system, receive electromagnetic energy from other objects that emit electromagnetic energy within the radar systems' field of view, and/or receive noise and signals due to clutter. Typically, the radar system determines whether one or more object exists within all of the received electromagnetic energy.

Unmanned aerial systems (UAS) (e.g., drones) have been used in warfare by malicious actors to deliver weaponized payloads and/or provide locations of troop movements. Commercial UAS can be low cost, easy to fly and/or readily available.

Typically, UAS are difficult to detect with radar systems, and human visual detection cannot be heavily relied upon. One difficulty with detecting UAS with radar systems is that UAS typically reflects electromagnetic energy (e.g., signals) with characteristics that are similar to clutter, and thus can be difficult to distinguish from clutter.

Therefore, it can be desirable to distinguish UAS from noise and/or clutter using a radar system to reliably detect and track UAS with a radar system.

SUMMARY OF THE INVENTION

Advantages of the invention can include an ability for a radar system to distinguish a UAS from noise and/or clutter, an ability for a radar system to reliably track a UAS. Advantages of the invention can also include reliably tracking a UAS while eliminating/minimizing the use of transmit resources of the radar, allowing the radar to use transmit pulses for other missions and/or minimizing power consumption.

In one aspect, the invention involves a method for a radar system to detect and track an unmanned aerial system (UAS). The method can involve receiving, by the radar system, a plurality of electromagnetic signals. The method can also involve determining, by the radar system, whether a UAS is included in the plurality of electromagnetic signals based on one or more expected frequencies that one or more UAS devices use to transmit signals to remote controls. The method can also involve for a UAS that is included in the plurality of electromagnetic signals, setting, by the radar system, the radar system into an active track mode to track the UAS.

In some embodiments, the method can involve assigning, by the radar system, a unique identifier to the UAS when it is included in the plurality of electromagnetic signals. In some embodiments, the method can involve determining, by the radar system, whether the UAS that is included in the plurality of electromagnetic signals is a friend or foe by transmitting, by the radar system, a signal to the UAS and waiting for an expected signal to be transmitted back to the radar system.

In some embodiments, determining whether the UAS is included in the plurality of electromagnetic signals is further based on comparing frequencies of the plurality of electromagnetic signals against the one or more expected frequencies. In some embodiments, the method can involve determining a range of the UAS when it is determined to be included in the plurality of electromagnetic signals.

In some embodiments, the range is based on a power of a signal plus an expected transmit power and antenna gain of the UAS as determined from the plurality of electromagnetic signals. In some embodiments, the method involves tracking, by the radar system, the UAS based on a single pulse waveform. In some embodiments, the method involves determining a maximum UAS detection range based on a minimum receive power that the radar system can use to determine a UAS is present.

In another aspect, the invention includes a radar system. The radar system can include a plurality of antennas to transmit and receive electromagnetic signals. The radar system can also include a processor coupled to the plurality of antennas configured to cause the radar system to receive a plurality of electromagnetic signals, determine whether a UAS is included in the plurality of electromagnetic signals based on one or more expected frequencies that one or more UAS devices use to transmit signals to remote control, and for a UAS that is included in the plurality of electromagnetic signals, set the radar system into an active track mode to track the UAS.

In another aspect, the invention includes an article comprising a non-transitory computer-readable storage medium, having instructions stored thereon that when executed by at least one processor, cause the at least one processor to receive a plurality of electromagnetic signals, determine whether a UAS is included in the plurality of electromagnetic signals based on one or more expected frequencies that one or more UAS devices use to transmit signals to remote controls, and for a UAS that is included in the plurality of electromagnetic signals, set a radar system into an active track mode to track the UAS.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/ or circuits have not been described in detail so as not to obscure the invention.

Figure 1:
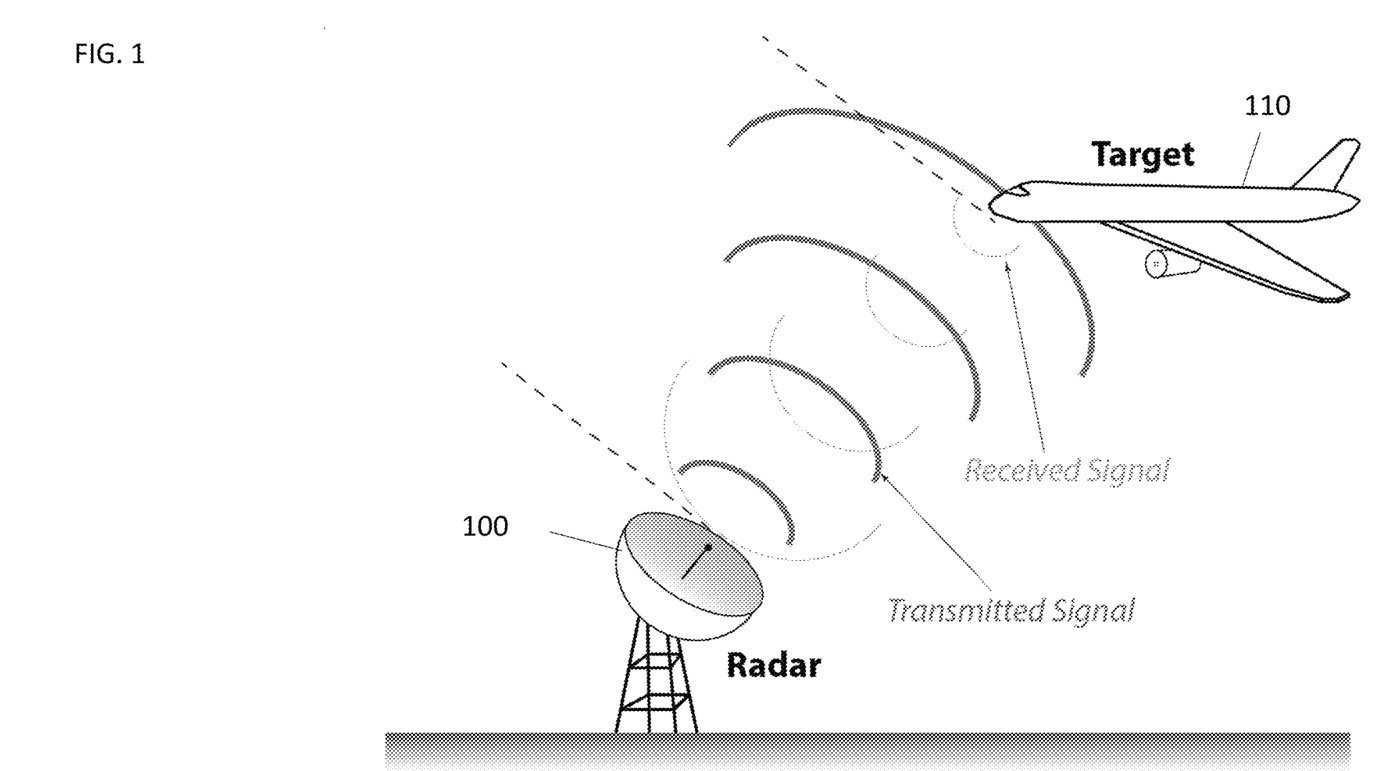
FIG. 1 is an example of a radar system and object, according to some embodiments of the invention.

FIG. 1 is an example of a radar system 100 and an object 110, according to some embodiments of the invention. The radar system 100 can emit electromagnetic energy (e.g., transmitted signals) and receive electromagnetic energy (e.g., received signals). When the transmitted signal impinges upon the object 110, at least a portion of the transmitted signal can reflect off of the object 110 and can be received by the radar system 100, such that the radar system 110 can detect the object 110 exists. The radar system 100 can also receive electromagnetic energy from noise, clutter, and/or other emitting systems within the vicinity of the radar system 100.

Figure 2:
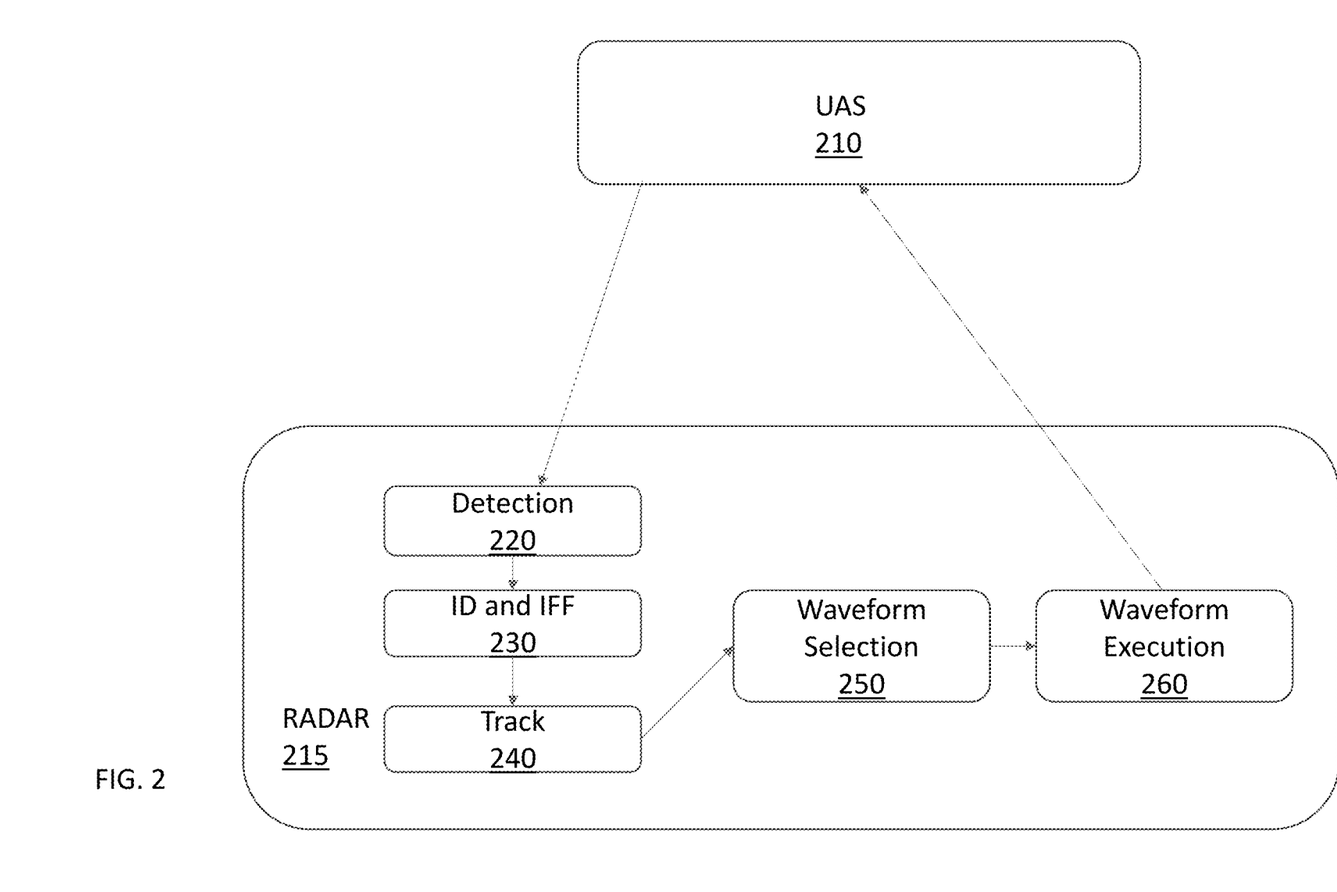
FIG. 2 is a block diagram of a radar system architecture for detecting and tracking an unmanned aerial system (UAS), according to some embodiments of the invention.

FIG. 2 is a block diagram of a radar system architecture 215 for detecting and tracking a UAS 210, according to some embodiments of the invention.

The radar system architecture 215 includes a detection module 220, an identification (ID) and friend or foe (IFF) module 230, a track module 240, a waveform selection module 250, and a waveform execution module 260. The radar system architecture 215 can be implemented within a radar system. The radar system can be a mechanically steered, passively electronically scanned, active electronically scanned or any combination thereof. The radar system can track one target at a time (e.g., during mechanical steering), track up to 100 targets at a time and/or track hundreds of targets as a time.

The radar system can emit electromagnetic waves (e.g., transmit) and receive electromagnetic waves (e.g., listen) according to a duty cycle, as is known in the art. The radar system can receive electromagnetic waves that can include reflections (e.g., a plurality reflection signals) from objects (not shown) within a field of view of the radar system, electromagnetic waves emitted from the UAS 210 (e.g., signals a UAS emits to a controlling device), electromagnetic reflections from the UAS, and/or noise/clutter. The detection module 220 can detect the UAS 210 among the received electromagnetic waves based on one or more expected frequencies that one or more UAS devices use to transmit signals to remote controls. For example, UAS devices can output transmit signals at specific frequencies (e.g., expected frequencies) to its respective remote control (e.g., 2.4, 4.1 and 5.8 Ghz). The one or more expected frequencies can be input by a user and/or stored in a lookup table.

The detection module 220 can compare the frequencies of the received signals against the one or more expected frequencies to determine whether one or more UAS devices is included in the received signals.

Upon determining that a UAS exists in the received signals, the detection module 220 can transmit an angle and/or distance of the UAS with respect to the radar to the ID and IFF module 230. The ID and IFF module 230 can assign a unique identifier to the detected UAS signal and determine whether the detected UAS signal represents a UAS that is a friend or foe. Determining whether the detected UAS signal is a friend of foe can involve transmitting an electromagnetic signal to the UAS 210 (e.g., pinging the UAS 210) and if the UAS 210 returns an expected electromagnetic signal (e.g., a predetermined known signal signal) then the detected UAS signal is determined to be a friend. Otherwise, the detected UAS signal is determined to be a foe. If the detected UAS signal is determined to be a foe, then the detected UAS signal is transmitted to the track module 240.

The track module 240 can transmit a location of the UAS (e.g., angle and/or distance), speed (e.g., velocity in m/s), acceleration (e.g., in m/s$^2$), and/or heading direction to the waveform selection module 250. The waveform selection module 250 can determine a waveform to transmit from the radar system to track the UAS 210. The waveform can be a single pulse waveform. In some embodiments, the waveform has a pulse width that is less then 1 microsecond. In some embodiments, the waveform has a beam width that is increased to cover all (or most) of the field of view with a single beam to, for example, save radar timeline to avoid having to spend the time doing separate beams at each position.

The waveform selection module 250 transmits the selected waveform to the waveform execution module 260 which instructs the radar system to emit. Instructing the radar system can include providing a number of pulses, pulse repetition frequency, pulse width, bandwidth, and/or frequency.

Figure 3:
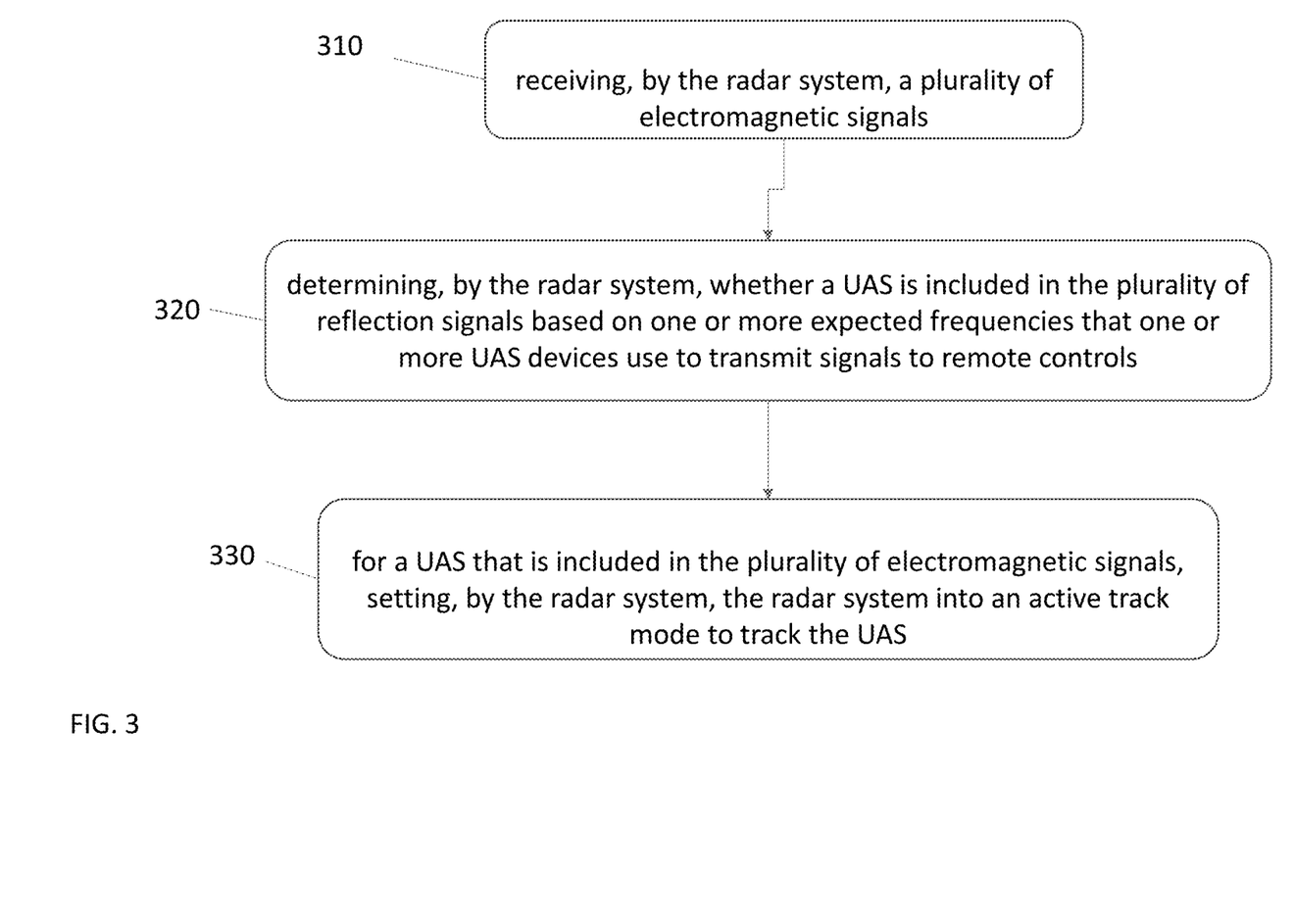
FIG. 3 is a flow chart of a method for a radar system to detect and track a UAS, according to some embodiments of the invention.
Figure 3A:
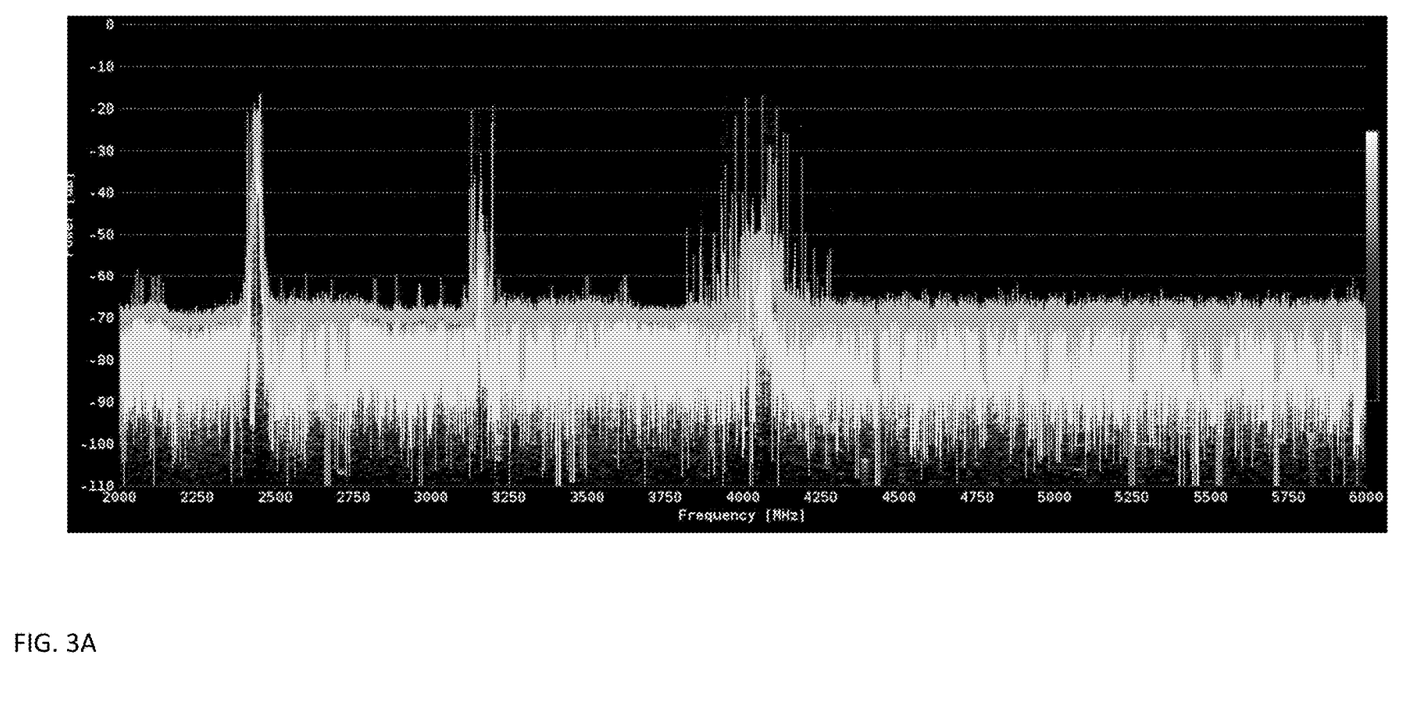
FIG. 3A is an example of reflections received by the radar, with the spikes showing portions due to a UAS, according to some embodiments of the invention.

FIG. 3 is a method for a radar system (e.g., radar system 100, as described above in FIG. 1) to detect and track a UAS (e.g., UAS 210, as described above in FIG. 2), according to some embodiments of the invention. The method can involve receiving, by the radar system, electromagnetic waves (Step 310). The electromagnetic waves can include reflections from objects, within a field of view of the radar system, clutter and/or electromagnetic waves emitted from one or more UAS devices. FIG. 3A is an example of reflections received by the radar, with the spikes showing portions due to a UAS.

Turning back to FIG. 3, the method can also involve determining, by the radar system, whether a UAS is included in the electromagnetic waves based on one or more expected frequencies that one or more UAS devices use to transmit signals to remote controls (Step 320). For example, UAS devices can output transmit signals at known frequencies to its remote control (e.g., 2.4, 4.1 and 5.8 Ghz). The one or more expected frequencies can be input by a user and/or stored in a lookup table.

In some embodiments, determining whether the UAS is included in the plurality of electromagnetic signals is further based on comparing frequencies of the plurality of electromagnetic signals against the one or more expected frequencies.

In some embodiments, when it is determined that a UAS is included in the plurality of electromagnetic signals, a range for the UAS is determined. The range (R) can be determined as shown below in EQN. 1:

$$R = \sqrt{\frac{(P_t G_t)_{UAS} G_r}{P_r} \frac{\lambda^2}{(4\pi)^2}} \qquad \text{EQN. 1}$$

where $P_t$ is a power of a signal transmitted from the UAS, $G_t$ is a transmit gain of an antenna on the UAS, $G_r$ is a receive gain of the radar system, $\lambda$ is a wavelength of the signal transmitted by the UAS, and $P_r$ is the power received by the radar system.

In some embodiments, a maximum UAS detection range based on a minimum receive power of the radar system can be determined. The maximum UAS detection range ($R_{max}$) can be determined as shown below in EQN. 2:

$$R_{max} = \sqrt{\frac{(P_t G_t)_{UAS} G_r}{P_{r,min}} \frac{\lambda^2}{(4\pi)^2}} \qquad \text{EQN. 2}$$

where $P_t$ is a power of a signal transmitted from the UAS, $G_t$ is a transmit gain of an antenna on the UAS, $G_r$ is a receive gain of the radar system, $\lambda$ is a wavelength of the signal transmitted by the UAS, and $P_{r,min}$ is the minimum power received that the radar system can determine a UAS is present.

The method can also involve for a UAS that is included in the plurality of electromagnetic signals, setting, by the radar system, the radar system into an active track mode to track the UAS (Step 330).

In some embodiments, setting the radar system into an active track mode involves determining whether the UAS is a friend or foe and if the UAS is a foe, assigning a unique identifier to the UAS and/or entering the UAS into a list of tracks within a tracker of the radar system. In some embodiments, setting the radar system into an active track mode involves determining a waveform for the radar system to emit for tracking the UAS.

In some embodiments, setting the radar system into an active track mode involves entering the UAS into a tracker of the radar system. The tracker can be a tracking module and/or system as is known in the art and/or based on the particular radar system.

Figure 4:
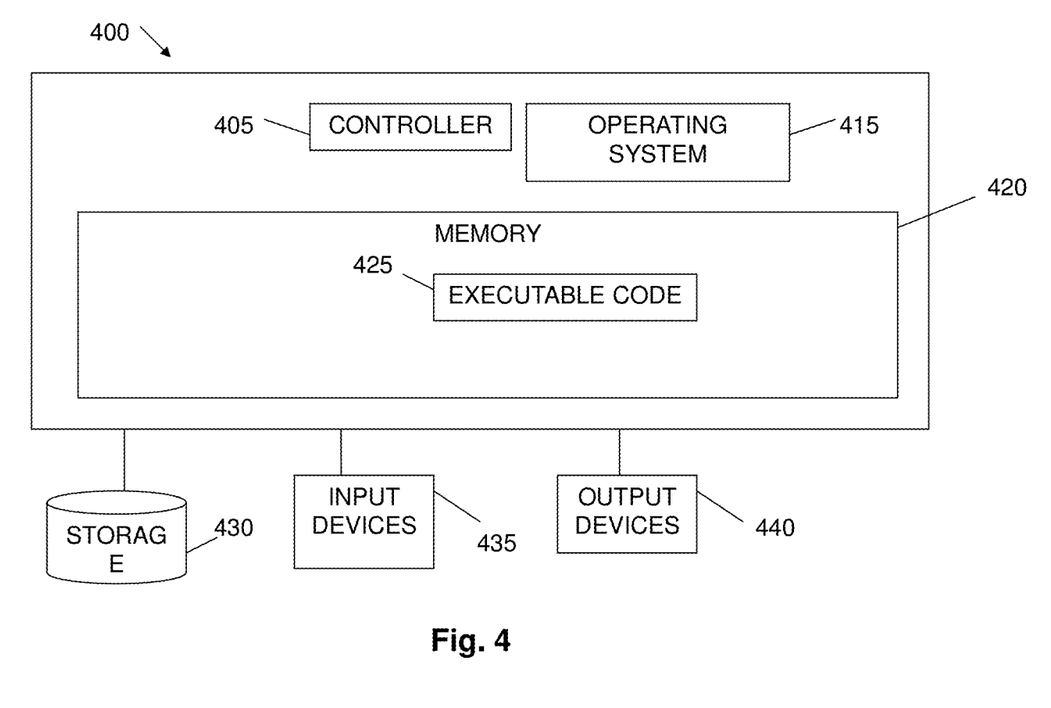
FIG. 4 is a high-level block diagram of an exemplary computing device which can be used with embodiments of the invention.

FIG. 4 is a high-level block diagram of an exemplary computing device which can be used with embodiments of the invention, for example, as part of a radar system as described above. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440. Each of modules and equipment such as processors, modules, boards, integrated circuits, and other equipment mentioned herein can be or include a computing device such as included in FIG. 1 and FIG. 2, although various units among these entities can be combined into one computing device.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of, possibly different memory units. Memory 420 can store for example, instructions to carry out a method (e.g. code 425), and/or data such as user responses, interruptions, etc.

Executable code 425 can be any executable code, e.g., an application, a program, a process, task or script. Executable code 425 can be executed by controller 405 possibly under control of operating system 415. For example, executable code 425 can when executed cause the antenna's to emit radiation and/or receive radiation for processing according to embodiments of the invention. In some embodiments, more than one computing device 400 or components of device 600 can be used for multiple functions described herein. For the various modules and functions described herein, one or more computing devices 400 or components of computing device 400 can be used. Devices that include components similar or different to those included in computing device 400 can be used, and can be connected to a network and used as a system. One or more processor(s) 405 can be configured to carry out embodiments of the invention by for example executing software or code. Storage 430 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405. In some embodiments, some of the components shown in FIG. 4 can be omitted.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (NIC), a modem, printer or facsimile machine, a universal serial bus (USB) device or external hard drive can be included in input devices 435 and/or output devices 440.

Embodiments of the invention can include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for a radar system to detect and track an unmanned aerial system (UAS), the method comprising:
   receiving, by the radar system, a plurality of electromagnetic signals;
   determining, by the radar system, whether a UAS is detected based on the plurality of electromagnetic signals by comparing the plurality of electromagnetic signals to two or more expected frequencies that two or more UAS devices use to transmit signals to remote controls; and
   for a UAS that is detected based on the plurality of electromagnetic signals, setting the radar system into an active track mode to track the UAS and determining a range of the UAS based on (i) a power of a signal transmitted from the UAS, (ii) a transmit gain of an antenna of the UAS, (iii) a receive gain of the radar system, (iv) a wavelength of the signal transmitted from the UAS, and (v) a power received by the radar system.

2. The method of claim 1, further comprising:
   assigning, by the radar system, a unique identifier to the UAS in response to detecting the UAS based on the plurality of electromagnetic signals.

3. The method of claim 1, further comprising:
   determining, by the radar system, whether the UAS that is detected based on the plurality of electromagnetic signals is a friend or foe by transmitting, by the radar system, a specified signal to the UAS and waiting for an expected signal to be transmitted back to the radar system.

4. The method of claim 1, wherein determining whether the UAS is detected based on the plurality of electromagnetic signals is further based on comparing frequencies of the plurality of electromagnetic signals against the two or more expected frequencies.

5. The method of claim 1, wherein the range is determined using a formula of:

$$R = \sqrt{\frac{(P_t G_t)_{UAS} G_r}{P_r} \frac{\lambda^2}{(4\pi)^2}}$$

where R represents the range of the UAS, $P_t$ represents the power of the signal transmitted from the UAS, $G_t$ represents the transmit gain of the antenna of the UAS, $G_r$ represents the receive gain of the radar system, $\lambda$ represents the wavelength of the signal transmitted from the UAS, and $P_r$ represents the power received by the radar system.

6. The method of claim 1, further comprising:
   tracking, by the radar system, the UAS based on a single pulse waveform.

7. The method of claim 1, further comprising determining a maximum UAS detection range based on (i) the power of the signal transmitted from the UAS, (ii) the transmit gain of the antenna of the UAS, (iii) the receive gain of the radar system, (iv) the wavelength of the signal transmitted from the UAS, and (v) a minimum power received that the radar system is able to determine the UAS is present.

8. The method of claim 7, wherein the maximum UAS detection range is determined using a formula of:

$$R_{max} = \sqrt{\frac{(P_t G_t)_{UAS} G_r}{P_{r,min}} \frac{\lambda^2}{(4\pi)^2}}$$

where $R_{max}$ represents the maximum UAS detection range, $P_t$ represents the power of the signal transmitted from the UAS, $G_t$ represents the transmit gain of the antenna of the UAS, $G_r$ represents the receive gain of the radar system, $\lambda$ represents the wavelength of the signal transmitted from the UAS, and $P_{r,min}$ represents the minimum power received that the radar system is able to determine the UAS is present.

9. A radar system comprising:
   a plurality of antennas configured to transmit and receive electromagnetic signals; and
   at least one processor coupled to the plurality of antennas and configured to cause the radar system to:
   receive a plurality of electromagnetic signals;
   determine whether a UAS is detected based on the plurality of electromagnetic signals by comparing the plurality of electromagnetic signals to two or more expected frequencies that two or more UAS devices use to transmit signals to remote controls; and for a UAS that is detected based on the plurality of electromagnetic signals, set the radar system into an active track mode to track the UAS and determine a range of the UAS based on (i) a power of a signal transmitted from the UAS, (ii) a transmit gain of an antenna of the UAS, (iii) a receive gain of the radar system, (iv) a wavelength of the signal transmitted from the UAS, and (v) a power received by the radar system.

10. The radar system of claim 9, wherein the at least one processor is further configured to cause the radar system to assign a unique identifier to the UAS in response to detecting the UAS based on the plurality of electromagnetic signals.

11. The radar system of claim 9, wherein the at least one processor is further configured to cause the radar system to determine whether the UAS that is detected based on the plurality of electromagnetic signals is a friend or foe by causing the radar system to transmit a specified signal to the UAS and wait for an expected signal to be transmitted back to the radar system.

12. The radar system of claim 9, wherein the at least one processor is configured to cause the radar system to determine whether the UAS is detected based on the plurality of electromagnetic signals further based on a comparison of frequencies of the plurality of electromagnetic signals against the two or more expected frequencies.

13. The radar system of claim 9, wherein the at least one processor is configured to cause the radar system to determine the range of the UAS using a formula of:

$$R = \sqrt{\frac{(P_t G_t)_{UAS} G_r}{P_r} \frac{\lambda^2}{(4\pi)^2}}$$

where R represents the range of the UAS, $P_t$ represents the power of the signal transmitted from the UAS, $G_t$ represents the transmit gain of the antenna of the UAS, $G_r$ represents the receive gain of the radar system, $\lambda$ represents the wavelength of the signal transmitted from the UAS, and $P_r$ represents the power received by the radar system.

14. The radar system of claim 9, wherein the at least one processor is further configured to cause the radar system to track the UAS based on a single pulse waveform.

15. The radar system of claim 9, wherein the at least one processor is further configured to cause the radar system to determine a maximum UAS detection range based on (i) the power of the signal transmitted from the UAS, (ii) the transmit gain of the antenna of the UAS, (iii) the receive gain of the radar system, (iv) the wavelength of the signal transmitted from the UAS, and (v) a minimum power received that the radar system is able to determine the UAS is present.

16. The radar system of claim 15, wherein, to determine the maximum UAS detection range, the at least one processor is configured to use a formula of:

$$R_{max} = \sqrt{\frac{(P_t G_t)_{UAS} G_r}{P_{r,min}} \frac{\lambda^2}{(4\pi)^2}}$$

where $R_{max}$ represents the maximum UAS detection range, $P_t$ represents the power of the signal transmitted from the UAS, $G_t$ represents the transmit gain of the antenna of the UAS, $G_r$ represents the receive gain of the radar system, $\lambda$ represents the wavelength of the signal transmitted from the UAS, and $P_{r,min}$ represents the minimum power received that the radar system is able to determine the UAS is present.

17. An article comprising a non-transitory computer-readable storage medium having instructions stored thereon that when executed by at least one processor of a radar system, cause the at least one processor to:
receive a plurality of electromagnetic signals;
determine whether a UAS is detected based on the plurality of electromagnetic signals by comparing the plurality of electromagnetic signals to two or more expected frequencies that two or more UAS devices use to transmit signals to remote controls; and
for a UAS that is detected based on the plurality of electromagnetic signals, set the radar system into an active track mode to track the UAS and determine a range of the UAS based on (i) a power of a signal transmitted from the UAS, (ii) a transmit gain of an antenna of the UAS, (iii) a receive gain of the radar system, (iv) a wavelength of the signal transmitted from the UAS, and (v) a power received by the radar system.

18. The article of claim 17, wherein the instructions that when executed cause the at least one processor to determine the range of the UAS comprise:
instructions that when executed cause the at least one processor to determine the range of the UAS using a formula of:

$$R = \sqrt{\frac{(P_t G_t)_{UAS} G_r}{P_r} \frac{\lambda^2}{(4\pi)^2}}$$

where R represents the range of the UAS, $P_t$ represents the power of the signal transmitted from the UAS, $G_t$ represents the transmit gain of the antenna of the UAS, $G_r$ represents the receive gain of the radar system, $\lambda$ represents the wavelength of the signal transmitted from the UAS, and $P_r$ represents the power received by the radar system.

19. The article of claim 17, the non-transitory computer-readable storage medium further having instructions stored thereon that, when executed by the at least one processor, cause the at least one processor to determine a maximum UAS detection range based on (i) the power of the signal transmitted from the UAS, (ii) the transmit gain of the antenna of the UAS, (iii) the receive gain of the radar system, (iv) the wavelength of the signal transmitted from the UAS, and (v) a minimum power received that the radar system is able to determine the UAS is present.

20. The article of claim 19, wherein the instructions that when executed cause the at least one processor to determine the maximum UAS detection range comprise:
instructions that when executed cause the at least one processor to determine the maximum UAS detection range using a formula of:

$$R_{max} = \sqrt{\frac{(P_t G_t)_{UAS} G_r}{P_{r,min}} \frac{\lambda^2}{(4\pi)^2}}$$

where $R_{max}$ represents the maximum UAS detection range, $P_t$ represents the power of the signal transmitted from the UAS, $G_t$ represents the transmit gain of the antenna of the UAS, $G_r$ represents the receive gain of the radar system, $\lambda$ represents the wavelength of the signal transmitted from the UAS, and $P_{r,min}$ represents a minimum power received that the radar system is able to determine the UAS is present.

\* \* \* \* \*